United States Patent
Makinwa

[19]

[11] Patent Number: 5,952,999
[45] Date of Patent: Sep. 14, 1999

[54] EMPLOYING GRAY CODES FOR PEN DETECTION

[75] Inventor: Kofi A. A. Makinwa, Eindhoven, Netherlands

[73] Assignee: U.S. Philips Corporation, New York, N.Y.

[21] Appl. No.: 08/852,762

[22] Filed: May 7, 1997

[30] Foreign Application Priority Data

May 8, 1996 [EP] European Pat. Off. .............. 96201262

[51] Int. Cl.⁶ ............................. G08C 21/00; G09G 5/00
[52] U.S. Cl. .................. 345/173; 345/174; 178/18.01; 178/18.03; 178/19.01; 178/19.07
[58] Field of Search .................................. 345/173, 174, 345/104, 147; 178/18.01, 18.03, 18.05, 19.01, 19.07, 20.01, 20.03, 20.04

[56] References Cited

U.S. PATENT DOCUMENTS

| 3,819,857 | 6/1974 | Inokuchi | 178/19.03 |
| 4,126,760 | 11/1978 | Gordon | 178/18.05 |
| 5,210,380 | 5/1993 | McDermott | 178/18.07 |
| 5,416,280 | 5/1995 | McDermott | 178/20.04 |

*Primary Examiner*—Vijay Shankar
*Attorney, Agent, or Firm*—Brian J. Wieghaus

[57] ABSTRACT

A graphic tablet includes a number of parallel electrodes whereto a series of patterns is presented in order to determine the position of a pen relative to the electrodes. As a result of such presentation, a series of code elements is formed on an electrode, which series can be picked up by the pen and is representative of the relevant electrode. When the patterns are suitably chosen, a short series of patterns suffices, so that the determination of the position requires less time.

13 Claims, 3 Drawing Sheets

EMPLOYING GRAY CODES FOR PEN DETECTION

BACKGROUND OF THE INVENTION

The invention relates to a graphic tablet, including:

an array of substantially parallel electrodes, and a control circuit for presenting a series of successive patterns to the electrodes during a detection period, each pattern representing a signal value from among at least two standard values for each electrode, in order to form for each electrode, by way of said presentation, a series of successive code elements which is representative of the relevant electrode.

A tablet of this kind is known from European Patent Application EP 622 754 A1. The tablet is used inter alia as a graphic input apparatus via which given data is presented to a data processing system. To this end, the known tablet includes an array of parallel arranged electrodes and a signal sensor in the form of a pen which can be displaced relative to the electrodes. The relative position of the pen with respect to the electrodes constitutes one of the data presented to the data processing system by the tablet. The known tablet includes a control circuit which presents given patterns of signals to the electrodes which induce given signals in the pen in response thereto. The induced signals are applied to a detection circuit of the tablet. The relative position of the pen is determined by analysis of the signals presented and the signals detected. In a so-called coordinate detection period the control circuit of the known tablet presents a large number of successive patterns to the electrodes, each time one electrode then being given a voltage difference relative to the other electrodes. The signal induced in the pen is maximum at the instant at which the pattern with the voltage difference is presented to the electrode whereto the pen is nearest. Because of the presentation of the patterns, a series of code elements, represented by signal levels, is formed on each electrode during the detection period, said series being representative of the relevant electrode. The detection circuit can thus determine the relative position of the pen each time in a coordinate detection period. It is a drawback of the known tablet that the coordinate detection period is comparatively long, so that a comparatively long period of time is required to determine the instantaneous position of the signal sensor relative to the electrodes.

SUMMARY OF THE INVENTION

It is an object of the invention to provide a graphic tablet of the kind set forth in which the determination of the instantaneous position of the signal sensor is performed faster than in the known tablet. To this end, the graphic tablet according to the invention is characterized in that the control circuit is arranged to present said series with a length which is substantially smaller than the number of electrodes, the mutually different series of code elements together forming a code which is distributed across the signal values more symmetrically than a 1-out-of-n code. As a result of the presentation of a much shorter series of patterns, the time required for the detection of the relative position of the signal sensor is much shorter than in the known tablet. The different series of code elements now form a code whose distribution is better than that of the known code, so that each series is still representative of the relevant electrode. Because the relative position of the signal sensor can be determined faster, the time elapsing between the determination of successive relative positions of the signal sensor can be reduced. Consequently, a signal sensor in motion can be more accurately tracked by the tablet. This is important, for example when the graphic tablet is used for signature verification during which a user writes text on the tablet by means of the signal sensor.

The determination of the relative position of a signal sensor on the basis of a code representative of said position in a graphic tablet is known per se. It is described, for example in European Patent Application EP 455 985 A1. Therein, a complex geometrical structure of the electrodes ensures that the signals to be detected form a unique code in a given relative position. This is a construction which completely deviates from that of the graphic tablet according to the invention in which the individual electrodes extend in parallel over a given length of the tablet and are not interconnected. The structure of the tablet known from EP 455 985 A1 is difficult to manufacture and, because of the various connections, it has a comparatively small active surface on which the relative position of the pen can be determined.

An embodiment of the graphic tablet according to the invention is characterized in that the code elements are bivalent. Two standard values are thus involved, in response to a given pattern an electrode being presented with the one or the other standard value as the signal value. This makes it easy to distinguish the code elements in the signal sensor. When a binary code is used, the number of patterns required equals a power of two, two to said power being at least equal to the number of positions to be detected on the tablet. For example, when 64 positions are to be detected, the graphic tablet according to the invention requires only six patterns as opposed to the 64 patterns required in the known tablet.

An embodiment of the graphic tablet according to the invention is characterized in that the series of code elements form words of a Gray code. A given series of code elements then deviates from the adjoining series in respect of one code element only. This improves the discrimination when the signal sensor is situated near the boundary between the relevant electrodes.

An embodiment of the graphic tablet according to the invention is characterized in that it includes a permanent memory for the storage of the series of patterns, the control circuit being arranged to receive the series of patterns from the permanent memory. The series of patterns is determined in advance and stored in the memory, so that it need not be determined during the detection period. The control circuit can then read the patterns directly from the memory for presentation to the electrodes. This saves time, so that the determination of the instantaneous position of the signal sensor relative to the electrodes is faster.

An embodiment of the graphic tablet according to the invention is characterized in that the control circuit is arranged to group adjoining electrodes into a sub-array in order to subdivide the array into substantially equally large sub-arrays of electrodes, thus forming for each sub-array a series of successive code elements which is representative of the relevant sub-array. A number of electrodes are then grouped so as to form a sub-array and they all receive the same signal values, resulting in a stronger signal to be picked up by the signal sensor. Upon presentation of the series of patterns, for each sub-array there is formed a series of code elements which is representative of the relevant sub-array.

An embodiment of the graphic tablet according to the invention is characterized in that the control circuit is arranged to execute an interpolation step which includes the selection, from among the series of patterns, of the pattern with a representation for alternating signal values for successive sub-arrays, and the repeated representation of this pattern with a mutual shift amounting to a fraction of the length of a sub-array. The interpolation step enhances the resolution upon determination of the relative position of the signal sensor, being equal to the distance between the extreme electrodes in the sub-array when a number of electrodes are grouped so as to form a sub-array. Because the pattern containing an alternation of signal values for the successive sub-arrays is presented a number of times, each time with a small mutual shift, the transition from one signal value to the other will pass the signal sensor at a given instant. The instantaneous position of the signal sensor can be determined more accurately on the basis of the signals presented via these patterns.

An embodiment of the graphic tablet according to the invention is characterized in that the control circuit is arranged to provide, upon presentation of a pattern of the series, electrodes near a boundary of the sub-array with a voltage level which is higher than the voltage level corresponding to the higher one of the standard values and/or to provide a voltage level thereon which is lower than the voltage level corresponding to the lower one of the standard values. This compensates edge effects at areas in the pattern where the representation of the signal value for the electrodes changes its value. By making the voltage on the electrodes near the boundary where such a transition occurs higher than the voltage for the remainder of the electrodes of the sub-array when the sub-array receives the high signal value, or making it lower when the sub-array receives the low signal value, edge effects are compensated.

An embodiment of the graphic tablet according to the invention is characterized in that the graphic tablet includes a signal sensor which is displaceable relative to the electrodes in order to pick up signals to be generated by the electrodes in response to a given pattern, and a detection circuit which is coupled to the signal sensor in order to determine, on the basis of the signals picked up, an instantaneous position of the signal sensor relative to the electrodes during the detection period, the tablet including a measuring element for measuring an instantaneous noise level, the detection circuit being arranged to compare the instantaneous level of the signal picked up in the signal sensor with the measured instantaneous noise level, and the control circuit being arranged to execute the interpolation step on the basis of this comparison. The control circuit can then present patterns which contain increasingly smaller sub-series wherefrom the instantaneous position of the signal sensor can be determined with an increasing resolution until the instant at which the signal from the sub-series becomes insufficiently strong, in relation to the noise level, to enable reliable determination. Subsequently, an interpolation step takes place with the last pattern. As a result of the measurement of the instantaneous noise level at the tablet, the control circuit can continue the presentation of increasingly finer patterns as long as possible and proceed with the interpolation step only when necessary. As a result, the instantaneous position of the signal sensor can be determined in a minimum number of steps, adapted to the circumstances.

An embodiment of the graphic tablet according to the invention is characterized in that the control circuit is arranged to present, in addition to a pattern, an inverse version of the relevant pattern. As a result of the presentation of a pattern as well as its inverse version, a stronger signal arises in the signal sensor. Consequently, the measurement is less sensitive to noise and DC offset.

An embodiment of the graphic tablet according to the invention is characterized in that the tablet includes a display, the array of electrodes constituting a functional unit for generating a picture on the display. When the tablet is combined with a display, part of the time the electrodes are used for generating an image on the display and part of the time, being the so-called coordinate detection period, for determining the instantaneous position of the signal sensor. The invention offers a shorter coordinate detection period. Thus, more time can be reserved for generating the image and/or the instantaneous position of the signal sensor can be determined more frequently.

BRIEF DESCRIPTION OF THE DRAWINGS

These and other aspects of the invention will be apparent from and elucidated with reference to the embodiments described hereinafter.

In the drawings:

FIG. 2 shows the series of patterns of signals as presented to the electrodes in the known graphic tablet, FIG. 3 shows a series of patterns as presented to the electrodes in the graphic tablet according to the invention, FIG. 4 shows an alternative series of patterns according to the invention, FIG. 5 shows a series of patterns according to the invention for the formation of series of a Gray code, FIG. 6 shows a series of patterns according to the invention for the formation of series of a four-element Gray code.

Corresponding reference numerals in the drawing denote similar or corresponding parts.

DESCRIPTION OF THE PREFERRED EMBODIMENTS

Figure 1:
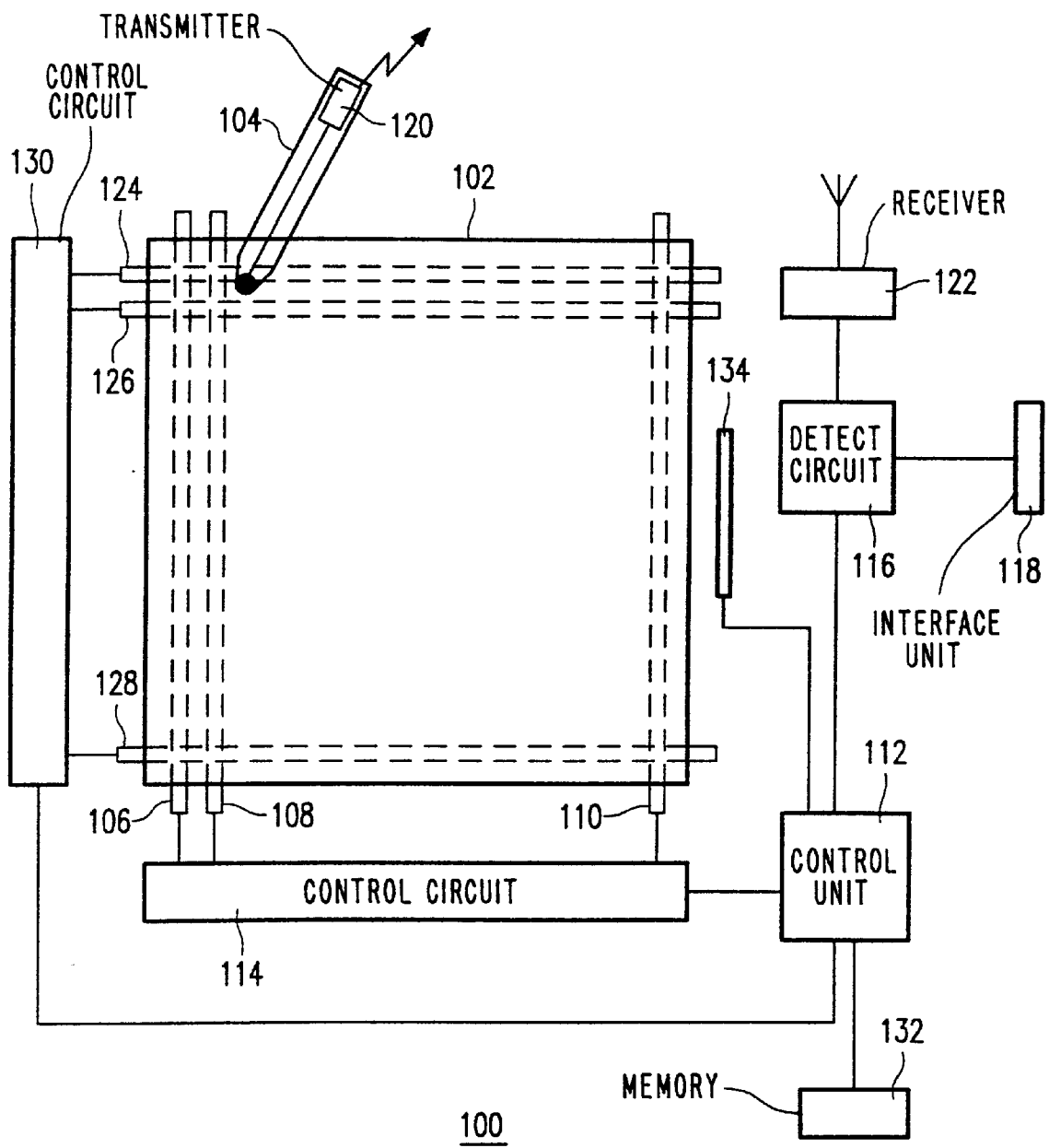
FIG. 1 shows diagrammatically a number of parts of the graphic tablet according to the invention.

FIG. 1 shows diagrammatically a number of parts of the graphic tablet according to the invention. A graphic tablet 100 of this kind is used as a graphic input apparatus for the presentation of data to a data processing system, for example a computer. The tablet includes a working surface 102 and a pen 104, the relative position of the pen with respect to the working surface constituting part of the data supplied. The tablet includes a number of parallel electrodes 106–110 whereto given signals are applied which are picked up by the pen by capacitive coupling. Under the control of a control unit 112, a control circuit 114 presents given patterns of signals to the electrodes and the signals picked up by the pen are applied to a detection circuit 116. On the basis of the signals received via the pen 104 and its knowledge of the signals supplied via the control circuit, the detection circuit determines the relative position of the pen with respect to the electrodes. The position determined can be applied to a data processing system via an interface unit 118. The pen can be coupled to the detection circuit by way of a wired connection. However, it is alternatively possible to provide the pen with a transmitter 120 for transmitting the information picked up, which information is subsequently received by a receiver 122 which is coupled to the detection circuit. This offers the advantage that a user will not be impeded by a wired connection between the pen and the tablet. A specific embodiment of the tablet utilizes an optical transmitter and receiver. The relative position of the pen transversely of the electrodes 106–110 can thus be determined. In order to enable determination of the relative position in the other direction of the surface 102 as well, the tablet can similarly be provided with electrodes 124–128, extending transversely of the electrodes 106–110, and with a control circuit 130 for driving said electrodes. In the embodiment of the tablet shown in FIG. 1, the patterns used for detection are stored in a permanent memory 132. This is one of the possibilities for presentation of the patterns by the control circuit. Prior to use the patterns can then be fetched directly from the memory and no time will be required to calculate the patterns. This saves time in determining the position.

As has already been stated, the coupling between the electrodes of the tablet and the pen is capacitive. The invention, however, can also be used in a tablet with another type of electromagnetic coupling to the pen or in which direct contact exists between the pen and the tablet. For the invention it suffices, as will be the case in any tablet, that signals which are presented to the electrodes of the tablet can be picked up in the pen. Evidently, the actual appearance of the pen is not important. It may be shaped as a pen, but other suitable shapes for a signal sensor are also feasible.

FIG. 2 shows the series of patterns of signals as presented to the electrodes in the known graphic tablet. This series is presented during a given coordinate detection period in which the relative position of the pen is determined in one of the directions of the tablet. A row contains the pattern of signals as applied to the electrodes at a given instant and substantially simultaneously. Row 202 shows the first pattern of the series, row 204 the second pattern, etc. up to and including row 206 which shows the last pattern of the series. A "0" in the pattern represents a signal level for the relevant electrode which corresponds to a low standard value and a "1" represents a signal level for the electrode which corresponds to a high standard value. The actual value of the voltage on an electrode is not important to the invention for as long as the two different values can be distinguished in the pen. For the low standard level, for example, the absence of an explicit signal on the electrode could be chosen. The number of elements in a pattern, i.e. a given row in FIG. 2, equals the number of electrodes of the tablet. A column in FIG. 2 shows the series of signals formed on a given electrode during the reception of the series of patterns. Column 208 shows the series of signals for the first electrode, column 210 for the second electrode etc. up to and including the column 212 for the last electrode. The patterns shown in FIG. 2 relate to a graphic tablet comprising 8 electrodes. This number has been chosen merely for the purpose of illustration, because a practical graphic tablet will comprise a much larger number of electrodes, that is to say as many as a few hundred. Each of the series of patterns of the known tablet contains one "1" for each time a different electrode. For each electrode this results in a series of code elements, being the signals of different level, which is representative of the relevant electrode. When the pen is in a given relative position in which it detects the series of code elements "00100000", on the basis thereof the detection circuit can determine that this position is situated near the third electrode. The number of patterns required in a series equals the number of electrodes in the known tablet. In the example of FIG. 2 eight patterns are required and a tablet comprising, for example 200 electrodes requires 200 patterns which must be presented during the relevant coordinate detection period.

FIG. 3 shows a series of patterns as presented to the electrodes in the graphic tablet according to the invention. Therein, a pattern contains several "1"s, meaning that several electrodes receive a high signal level upon presentation of such a pattern. When a pattern is composed in this manner, the series of code elements formed on the electrodes offer an improvement as regards the number of positions to be distinguished for a given length. The series of code elements now are code words which together form a code with a coverage better than the 1-out-of-n code according to the known tablet. This is because the series of code elements are more symmetrically distributed over the signal values than in a 1-out-of-n code. FIG. 3 shows an example involving three patterns, that is to say 302, 304 and 306, a representative series of code elements being formed for each of the 8 electrodes. For the first pattern 302, the electrodes are distributed into two halves, to each of which there is imparted a given signal level. This is because the pattern has a "0" for the four electrodes at the left and a "1" for the four electrodes at the right. Subsequently, in pattern 304 these halves are halved so as to have an own signal level again. The left half of the pattern 302 is divided into a left half, being one quarter of the total number, with "0"s and a right-half with "1"s. The same holds for the right half of the pattern 302. Finally, the parts of the pattern 304 are halved again, resulting in an alternation of "0"s and "1"s in conformity with the pattern 306. The series of code elements formed for the various electrodes are now code words according to the known binary code. Using this code, eight different words can be formed by means of three bits, corresponding to the fact that thus three patterns are required to form a representative series for each of the eight electrodes. When the invention is used for said example of a tablet with 200 electrodes, using this code only eight patterns will be required as opposed to the 200 patterns required in the known tablet. The time required to determine the relative position of the pen is thus substantially reduced.

FIG. 3 illustrates the invention on the basis of a binary code where an electrode receives a signal value from among two possible standard values. However, the invention can also be used by choosing a signal value from among a larger number of standard values. In that case there are formed code elements of a code having a larger radix, i.e. a radix equal to the number of standard values. For a given length a series can then assume a larger number of different values so that a larger number of positions can be distinguished by means of such series. When three standard values are used for the signal value of an electrode, already $3^4$ (=81) different positions can be indicated by means of a series of four code elements. However, an even larger number of standard values is feasible, so that an even larger number of positions can be distinguished with a possibly shorter series of code elements.

FIG. 4 shows an alternative series of patterns according to the invention. The sequence in which the patterns of a series are presented is not important in obtaining a representative series of code elements on each of the electrodes. The first pattern 402 is the same as the pattern 304 and the pattern 404 is the same as the pattern 302. In this case the series of three patterns again yields a representative series of code elements for each of the eight electrodes. The interchanging of two or more elements in each of the patterns also yields a series of patterns where the series of code elements of each of the electrodes is representative of the respective electrode. For example, interchanging the columns 408 and 410 yields a series with three new patterns which, however, still constitutes eight different series of code elements.

FIG. 5 shows a series of patterns according to the invention for the formation of series of a Gray code. The series of patterns 502, 504 and 506 are composed so that each of the series of code elements to be formed on the electrodes has the property that it deviates from an adjoining series in respect of one code element only. The elements thus form code words of a so-called Gray code. These series offer a better possibility of discrimination between two adjoining series. For example, when the pen is situated in a position between the electrode on which the series 508 is formed and the electrode on which the series 510 is formed, it must be decided on the basis of the signals picked up whether the series "011" or the series "010" has been received. By using this series of patterns, during determination uncertainty can arise about no more than one of the elements, which uncertainty is to be solved in a further operation. This is simpler than when there is uncertainty about a larger number of elements, as may occur in the patterns shown in the FIGS. 3 or 4. In the case of a larger number of code elements per series, the risk of a larger number of elements being different between two adjoining series according to these Figures increases substantially and it is advantageous to use the series according to a Gray code. Even longer series then retain the property that two adjoining series deviate in respect of one element only.

FIG. 6 shows a series of patterns according to the invention for the formation of series of a four-element Gray code. The patterns 602, 604, 606 and 608 form series of four code elements in each of the 16 positions, a series (for example, 610) deviating from an adjoining series, such as 612 and 614, in respect of one element only. The patterns can be formed by halving the positions available in the pattern with respect to the preceding pattern and by imparting a value "0" or "1" to all the parts obtained, adjoining parts being given an opposite value. The parts of a pattern are then arranged so that the centers of the parts of the instantaneous pattern are situated in positions of boundaries between the parts of the preceding pattern. Furthermore, in a pattern the magnitude of the parts at the edges amounts to half of that of the remaining parts of the pattern. The patterns shown in FIG. 6 form an example of the foregoing. The pattern 602 has two edge parts of 8 positions and no remaining parts (which would then be 16 positions). The pattern 604 has one remaining part of 8 positions and two edge parts of 4 positions. The center of the remaining part occupies the corresponding position of the boundary between the two parts of the preceding pattern 602. The pattern 606 has three parts of 4 positions and two edge parts of 2 positions, the position of the boundaries between parts in the pattern 604 again corresponding to centers of parts in the pattern 606. The pattern 608 has seven parts of 2 positions and two edge parts of 1 position. It is to be noted that the series of code elements remain words of a Gray code if patterns in the series are interchanged.

Figure 7:
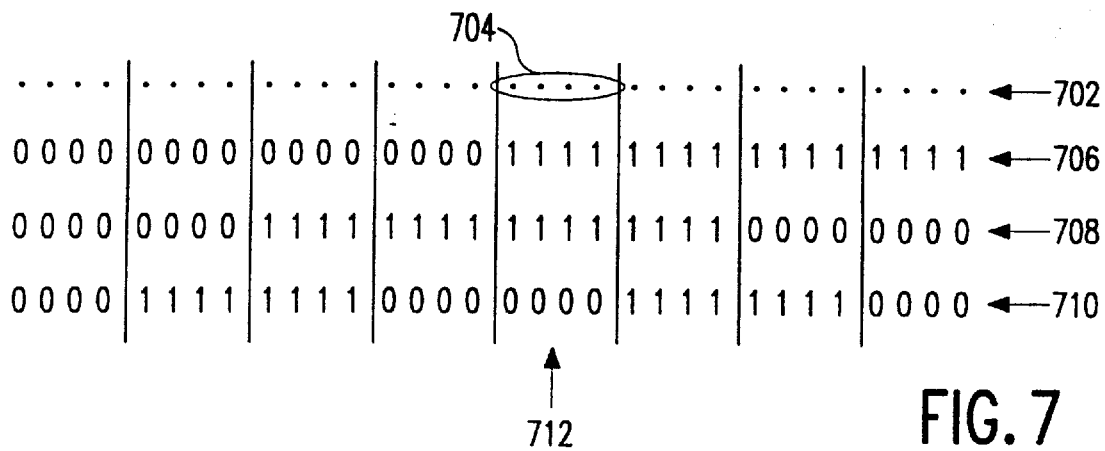
FIG. 7 shows a tablet in which the array of electrodes is subdivided into a number of sub-arrays.

FIG. 7 shows a tablet in which the array of electrodes is subdivided into a number of sub-arrays. If the tablet comprises many electrodes, it may be elected to use the patterns at a level which is coarser than the individual electrode. A sub-array of adjoining electrodes is then considered as if it were one electrode and all its electrodes receive the same signal values, thus forming a series of code elements which is representative of the relevant sub-array. The advantage resides in the fact that the level of the signal picked up in the pen is higher than in the case of a signal value per individual electrode. The electrode array 702 is shown to be subdivided into eight sub-arrays of four electrodes each, for example 704. Each of the patterns 706, 708 and 710 comprises 32 positions, mutually equal values being represented for each time at least four adjoining electrodes. For the sub-array 704 the patterns form the series of code elements 712 and when the pen is situated near one of the electrodes in the sub-array, it will pick up the series "110".

Figure 8:
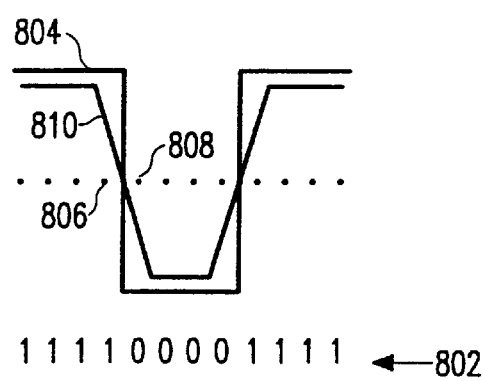
FIG. 8 is a detailed representation of the signals occurring in the pen for a part of a pattern.

FIG. 8 is a detailed representation of the signals occurring in the pen for a part of a pattern. When a given part 802 of a pattern is presented to the electrodes, ideally a signal arises in the pen whose value is represented as a function of the position by the line 804. As long as the pen is situated to the left of the electrode 806, the signal picked up is maximum and when the pen passes the boundary between the electrodes 806 and 808, the signal abruptly becomes minimum. Because of mutual influencing, such an acute transition does not occur in practice but rather a more gradual transition as represented, for example by the line 810. It is notably when the signal level on the electrodes is low that this effect is significant for the picking up of the signal and the discrimination of the signal values "0" and "1". The grouping of a number of electrodes so as to form a sub-array as described with reference to FIG. 7 can then be advantageously used. One remedy against the gradual transition is to supply electrodes near a transition with a voltage which is higher or a lower, respectively, than the value corresponding to the relevant signal level. In the example shown in FIG. 8, the electrode 806 receives a voltage which is higher than that received by the electrode to its left and the electrode 808 receives a voltage which is lower than that received by the electrode to its right. As a result, the signal transition is more acute and the positions near the border between the electrodes 806 and 808 can be discriminated better.

Figure 9:
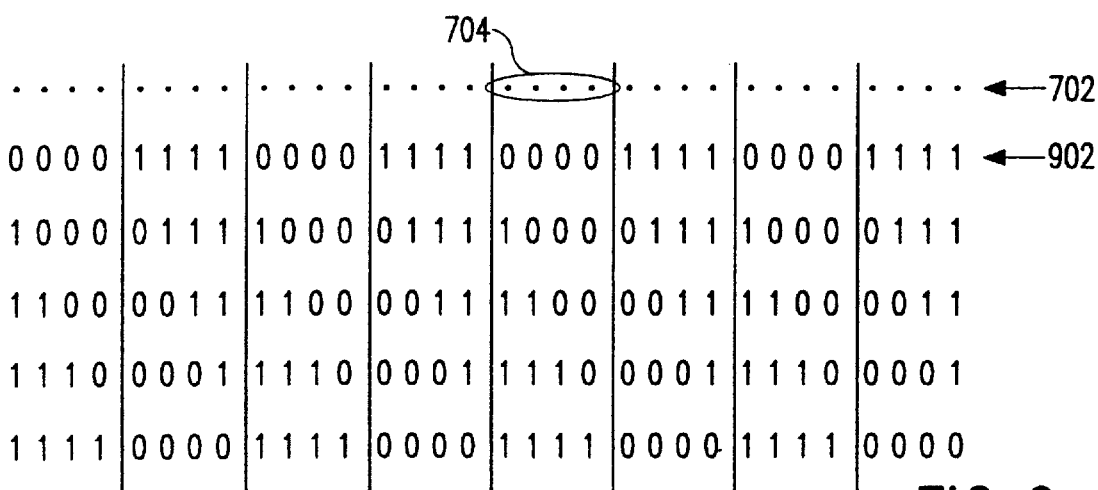
FIG. 9 illustrates the interpolation step according to the invention.

FIG. 9 illustrates the interpolation step according to the invention. When a procedure as described with reference to FIG. 7 reveals that the pen is situated in the sub-array 704, an interpolation step is performed for more accurate determination of the position. To this end, a pattern 902 with an alternation of groups of "0"s and groups of "1"s is repeatedly presented, each time shifted over a given fraction with respect to the electrodes. The groups are as large as the sub-array and in the present example they are shifted each time over the distance of an electrode. During the interpolation step, the pen which is situated in the sub-array 704 will pick up signals which correspond to the maximum value, to the minimum value, and to the transition as denoted by the line 810 in FIG. 8. Due to the shifting of the pattern, a transition between "0" and "1" will always pass the pen during the interpolation step. Using linear interpolation, from the various signals the detection circuit can determine the position of the pen with an accuracy which is better than the distance between two electrodes.

The method described with reference to FIG. 7 groups a number of electrodes so as to form a sub-array and the position of the pen is determined with an accuracy equal to the distance between the extreme electrodes in the sub-array. Given the sub-array in which the pen is situated, in the method according to FIG. 9 the position of the pen with respect to the relevant sub-array is determined with an accuracy which is better than the distance between two electrodes. Combination of the two methods yields a position determination which is more accurate and requires less time than in the known tablet. In a specific embodiment the graphic tablet has 640 electrodes available, which electrodes are subdivided into 64 sub-arrays of 10 electrodes in a manner similar to that used in FIG. 7. During a first step, the position of the pen is then determined, using a series of 6 patterns, with an accuracy equal to a distance of 10 electrodes. This is because the 6 patterns yield series of code elements having a length of 6 bits and capable of representing 64 values. Subsequently, during an interpolation step a pattern containing alternately 10 "0"s and 10 "1"s is presented six times, each time with a shift of two electrodes. This yields the position of the pen in the sub-array with an accuracy better than the distance between two electrodes. Overall, the determination of the relative position of the pen thus requires 12 patterns only.

The combination of the two methods has a supplementary effect in a sense that the second method is used at a point where the first method must stop. As can be seen in FIG. 7, the patterns of the first method involve initially large groups of electrodes with the same values, so that the signal to be picked up by the pen is strong. For each subsequent pattern the groups are halved and the strength of the signal decreases. This continues until the signal becomes too weak, in comparison with the noise level, so as to be picked up with adequate accuracy. Subsequently, the described interpolation step is performed with a pattern which comprises as many electrodes per group as there are electrodes in the smallest group in the last pattern of the first method. The cooperation between the two methods has an adaptive effect in a given embodiment of the tablet according to the invention. To this end, the tablet as shown in FIG. 1 is provided with a measuring element 134 which measures the instantaneous noise level in the vicinity of the tablet. The first method is applied with increasingly smaller groups of electrodes until the point is reached where the signal of the pattern would become too weak in comparison with the instantaneously measured noise level. Subsequently, an interpolation step is performed so as to determine the position of the pen with a higher accuracy, the pattern being dependent on the last pattern used in the first method. The adaptive combination offers the advantage that the first method is continued as long as possible, so that overall fewer patterns are required. The decision as regards the changing over from the one to the other method can be based on a table in which the maximum noise level at which the pattern can be used is stated per type of pattern. This maximum noise level could also be stored with the patterns in the permanent memory 132.

In a specific embodiment of the graphic tablet according to the invention, the presentation of a given pattern is succeeded by the presentation of a pattern which is an inverse version of the given pattern. When the signal received in the pen due to the two patterns is differentially measured, a signal is obtained which is much stronger than the signal yielded by a single pattern. The measurement then becomes less susceptible to noise and DC offset. Even though according to this method twice as many patterns must be presented in principle, the situation is less detrimental in practice. This is because measurement in conformity with the described first method can be continued longer, so that fewer patterns are required in the interpolation step. Furthermore, when the invention is used in combination with a liquid crystal display, the presentation of a pattern and its inverse version offers the major advantage that the mean DC voltage per pixel is zero. This prevents picture distortion of the patterns during the coordinate detection period.

The invention is particularly suitable for use in combination with a tablet integrated with a display. In such a tablet, for example as described in said European Patent Application EP 622 754 A1, the electrodes used for composing the image on the display are also used to determine the position of the pen. In the known tablet there is alternately a display period for the composition of the image and a coordinate detection period for the determination of the position of the pen transversely of the column electrodes, being the x ordinate of FIG. 3 of the cited reference. When the voltages on the electrodes are suitably chosen, the picture will not be affected by the signals presented during the detection period. The y-coordinate is determined in the display period by using signals for the determination of the position of the pen which are also used for the composition of the picture. In the tablet according to the invention, the patterns as described above with reference to the FIGS. 6, 7 and 9 are presented during said coordinate detection period. As a result, a shorter detection period may be chosen, so that the frequency of the composition of the picture may be chosen to be higher, thus enhancing the picture displayed. As an alternative to a higher picture frequency, a higher frequency can be chosen for the determination of the position of the pen. Fast movements of the pen can then be tracked better. Evidently, it is also possible to use a given combination of a higher picture frequency and a higher frequency of determination of the position of the pen.

Figure 10:
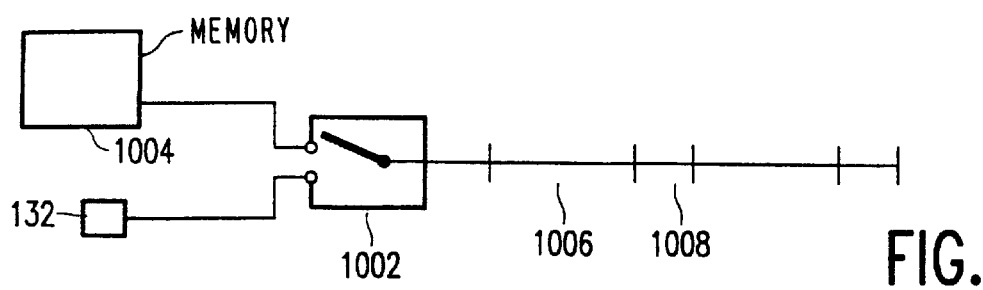
FIG. 10 shows diagrammatically the use of the invention in a graphic tablet integrated with a display.

FIG. 10 shows diagrammatically the use of the invention in a graphic tablet integrated with a display. The tablet includes a switch 1002 whereby data can be applied to the display at option from the memory 1004 or from the memory 132. The memory 1004 contains the picture data as supplied by an external system whereto the tablet is connected as a display unit. The memory 132 contains the patterns presented to the electrodes in order to determine the position of the pen. The switch 1002 is controlled by or forms part of the control unit 112. During the display period, denoted by the reference 1006, the electrodes receive the picture data whereas they receive the patterns for determining the position during the detection period, denoted by the reference 1008. It is a major advantage of the invention that it can be used in a universally available display, without the display having to be modified for that purpose.

In order to enable the invention to be used in integrated tablets, it suffices if the display is a so-called matrix-addressed type. This means that a pixel can be driven via a separate x-electrode and y-electrode. An example of such a display is an LCD (liquid crystal display) as used in one embodiment of the invention. A plasma display is another example in this respect.

I claim:

1. A graphic tablet, comprising:

an array of substantially parallel electrodes, and a control circuit which presents a series of successive patterns to the electrodes during a detection period, each pattern representing a signal value from among at least two standard values for each electrode, in order to form for each electrode a series of successive code elements which is representative of the relevant electrode, said series of successive code elements having a length which is substantially smaller than the number of electrodes, the mutually different series of code elements together forming a code which is distributed across the signal values more symmetrically than a 1-out-of-n code.

2. A graphic tablet as claimed in claim 1, in which code elements are bivalent.

3. A graphic tablet as claimed in claim 2, in which the series of code elements form words of a Gray code.

4. A graphic tablet as claimed in claim 1, including a permanent memory for the storage of the series of patterns, the control circuit to receiving the series of patterns from the permanent memory.

5. A graphic tablet as claimed in claim 1, in which the control circuit groups adjoining electrodes into a sub-array in order to subdivide the array into substantially equally large sub-arrays of electrodes, thus forming for each sub-array a series of successive code elements which is representative of the relevant sub-array.

6. A graphic tablet as claimed in claim 5, in which the control circuit selects, from among the series of patterns, the pattern with a representation for alternating signal values for successive sub-arrays, successively repeats this pattern with a mutual shift amounting to a fraction of the length of a sub-array, and interpolates among this repeated pattern.

7. A graphic tablet as claimed in claim 5, in which the control circuit provides electrodes near a boundary of the sub-array with a voltage level which is higher than the voltage level corresponding to the higher one of the standard values and/or to produce a voltage level thereon which is lower than the voltage level corresponding to the lower one of the standard values.

8. A graphic tablet as claimed in claim 6, including a signal sensor displaceable relative to the electrodes in order to pick up signals to be generated by the electrodes in response to a given pattern, and a detection circuit coupled to the signal sensor in order to determine, on the basis of the signals picked up, an instantaneous position of the signal sensor relative to the electrodes, the tablet including a measuring element for measuring an instantaneous noise level, the detection circuit comparing the instantaneous level of the signal picked up in the signal sensor with the measured instantaneous noise level, and the control circuit interpolating on the basis of this comparison.

9. A graphic tablet as claimed in claim 1, in which the control circuit presents, in addition to a pattern, an inverse version of the relevant pattern.

10. A graphic tablet as claimed in claim 1, in which the tablet includes a display, the array of electrodes constituting a functional unit for generating a picture on the display.

11. A graphic tablet as claimed in claim 10, in which the display includes an LCD with column electrodes, the column electrodes comprising the array of electrodes.

12. A graphic tablet as claimed in claim 1, including a signal sensor displaceable relative to the electrodes in order to pick up signals to be generated by the electrodes in response to a given pattern, and a detection circuit coupled to the signal sensor in order to determine, on the basis of the signals picked up, an instantaneous position of the signal sensor relative to the electrodes, the signal sensor including a transmitter for transmitting transmission signals corresponding to the signals picked up, and the tablet including a receiver for receiving the transmission signals and for applying these signals to the detection circuit.

13. A graphic tablet as claimed in claim 12, in which the transmitter and the receiver optically communicate the transmission signals.

* * * * *